United States Patent [19]

Scott

[11] Patent Number: 4,617,073

[45] Date of Patent: Oct. 14, 1986

[54] MOVEABLE CLAMP AND EDGE SEALING METHOD EMPLOYING SAME

[76] Inventor: Russell L. Scott, 1055 93rd Ave. N.W., Coon Rapids, Minn. 55433

[21] Appl. No.: 775,373

[22] Filed: Sep. 12, 1985

[51] Int. Cl.⁴ ........................ B32B 17/00; B32B 31/00

[52] U.S. Cl. ...................................... 156/107; 24/488; 24/509; 29/110.5; 156/109; 156/305; 156/575; 156/579; 269/58; 269/77; 269/254 R

[58] Field of Search ........................ 269/58, 77, 254 R; 29/110.5; 24/488, 509; 156/107, 579, 109, 305, 575

[56] References Cited

U.S. PATENT DOCUMENTS

| | | | |
|---|---|---|---|
| 2,231,132 | 2/1941 | Lovett . | |
| 2,615,113 | 10/1952 | Frye . | |
| 2,629,809 | 2/1953 | Frye . | |
| 2,723,931 | 11/1955 | Mercer . | |
| 3,340,131 | 9/1967 | Leibow . | |
| 3,568,285 | 3/1971 | Lieberg . | |
| 3,909,341 | 9/1975 | Moscovita | 156/579 |
| 4,030,961 | 6/1977 | Straeten et al. . | |
| 4,075,053 | 2/1978 | Adams . | |
| 4,109,432 | 8/1978 | Pilz | 156/109 |
| 4,174,246 | 11/1979 | Ralston . | |
| 4,252,058 | 2/1981 | Tison . | |
| 4,385,956 | 5/1983 | Pearl . | |
| 4,454,000 | 6/1984 | Schlemmer . | |

*Primary Examiner*—John J. Gallagher

*Attorney, Agent, or Firm*—Peterson, Wicks, Nemer & Kamrath

[57] ABSTRACT

A moveable clamp and an improved method of fabricating insulated glass is disclosed according to the preferred teachings of the present invention. The clamp includes first and second clamping rollers which are rotatably mounted to the first ends of first and second arms. The arms are pivotally mounted together by a third arm having a first end attached to the first arm and having a second end pivotally secured to the second arm. The second ends of the first and second arms are biased apart by a spring for creating a clamping force between the first and second clamping rollers. A first guide wheel is rotatably mounted to the first arm for rolling on the outside surface of the glass sheet to prevent the clamp from tipping with respect to the stacked glass sheets. A second guide wheel is rotatably mounted to the first arm for rolling on the edges of the stacked glass sheets for preventing the clamp from moving away from the perimeter of the stacked glass sheets. The clamp includes an abutment for abutting with the nozzle of the liquid sealing member applicator allowing the nozzle to push the clamp along the side of the stacked glass sheets. Thus, a continuous clamping force is applied to the stacked glass sheets and moveable with the applicator nozzle to prevent movement of the spacer between the stacked glass sheets during the application of the liquid sealing member.

22 Claims, 5 Drawing Figures

MOVEABLE CLAMP AND EDGE SEALING METHOD EMPLOYING SAME

BACKGROUND

The present invention relates generally to insulated glass and to clamps, and particularly, to methods of fabricating insulated glass and to moveable clamps, and more specifically, to moveable clamps for use in the fabrication of insulated glass.

With the growing awareness of the need for and the economics of energy conservation, the use of insulated glass in construction as a source of energy conservation has been increasing. Thus, a need has arisen for the simple and fast manufacture and fabrication of insulated glass which is economically feasible for small or moderate sized insulated glass fabricators.

SUMMARY

The present invention solves this and other needs in the fabrication of insulated glass by providing a moveable clamp usuable in the fabrication of insulated glass. In its preferred form, first and second members, shown as clamping rollers, place a clamping force on the outer surfaces of stacked glass sheets by biasing the members together. The nozzle of the applicator of the sealing member in liquid form may then abut with the moveable clamp for placing a continuous clamping force to the stacked glass sheets moveable with the nozzle to prevent movement of the spacer between the stacked glass sheets during the application of the liquid sealing member between the first and second glass sheets.

Further, the present invention solves this and other needs in the fabrication of insulated glass by providing an improved method of fabrication of insulated glass utilizing a moveable clamp.

Thus, it is an object of the present invention to provide a novel method of fabricating insulated glass.

Thus, it is an object of the present invention to provide a novel moveable clamp.

It is further an object of the present invention to provide such a novel method for fabrication of insulated glass utilizing a moveable clamp.

It is further an object of the present invention to provide such a novel moveable clamp which is economically feasible for small or moderate sized insulated glass fabricators.

It is further an object of the present invention to provide such a novel moveable clamp which is easily and economically manufactured and assembled.

It is further an object of the present invention to provide such a novel moveable clamp which may be easily and rapidly applied to the stacked glass sheets.

It is further an object of the present invention to provide such a novel moveable clamp which allows the faster and easier application of the sealing member.

It is further an object of the present invention to provide such a novel moveable clamp which allows the more consistent and accurate application of the sealing member.

It is further an object of the present invention to provide such a novel moveable clamp which is independently operable from the liquid sealing member applicator.

It is further an object of the present invention to provide such a novel moveable clamp which places a continuous clamping force to the stacked glass sheets and which is moveable with the nozzle of the liquid sealing member applicator.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings wherein.

Figure 1:
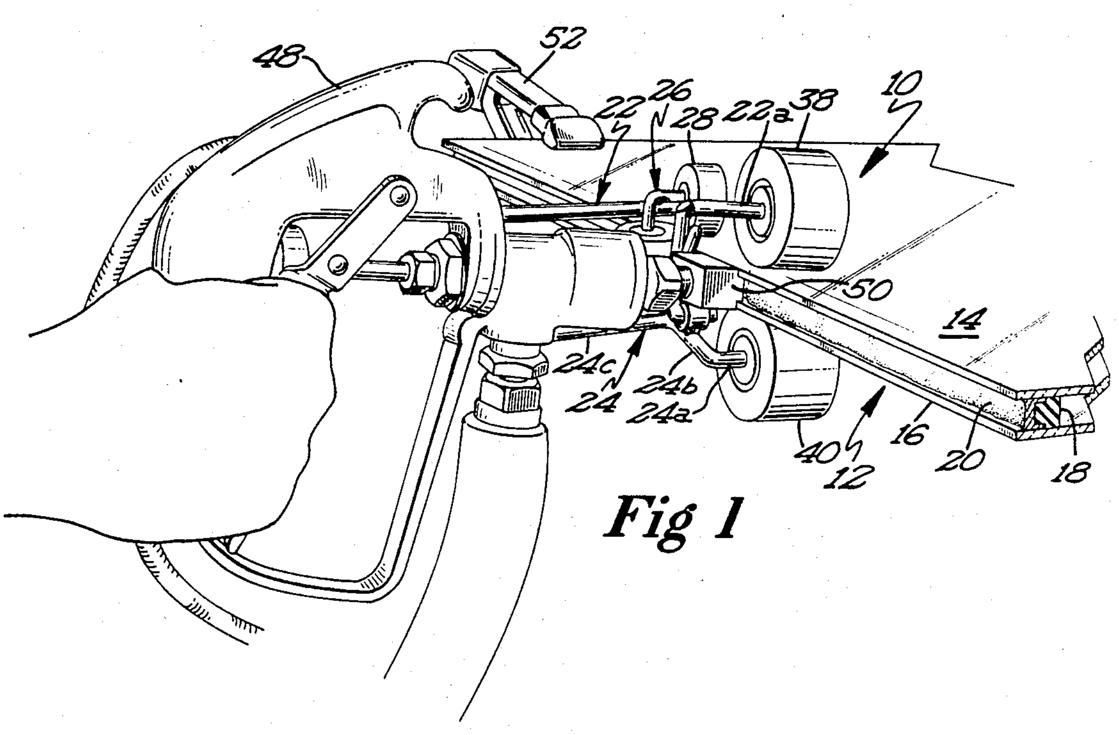
FIG. 1 shows a perspective view of a moveable, roller clamp according to the preferred form of the teachings of the present invention in use in the formation of insulated glass.
Figure 2:
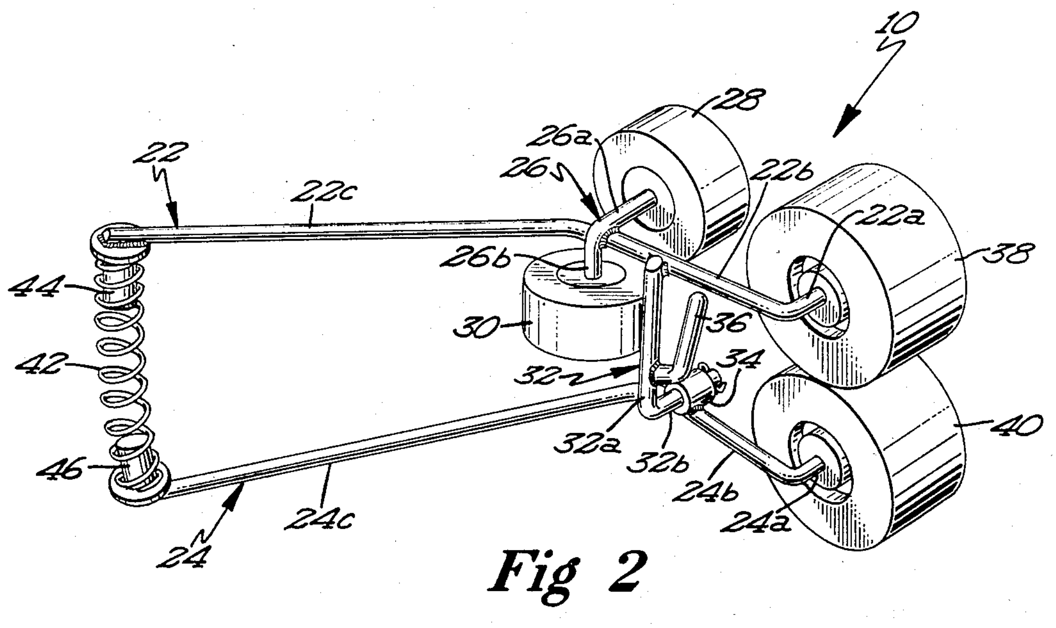
FIG. 2 shows a perspective view of the moveable, roller clamp of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "upper", "lower", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

A moveable, roller clamp according to the preferred embodiment of the teachings of the present invention is shown in the drawings for use in the formation of insulated or insulating glass and is generally designated 10. Generally, insulating glass 12 includes first and second sheets of glass 14 and 16, respectively. Glass sheets 14 and 16 are held in a stacked, spaced relation by a spacer 18, such as an aluminum spacer, located between glass sheets 14 and 16 generally at their outer perimeters. An insulating air space is created between glass sheets 14 and 16 by sealing together the perimeter edges of stacked glass sheets 14 and 16 by a sealing member 20 such as Butyl rubber which is applied in a melted condition and allowed to harden between glass sheets 14 and 16.

Clamp 10 includes a first, upper arm 22 and a second, lower arm 24. Arms 22 and 24 generally include a first portion **22*a* and 24*a*, a second portion 22*b* and 24*b*, and a third portion 22*c* and 24*c*, respectively. In their most preferred form, first portions 22*a* and 24*a* are generally perpendicular to second portions 22***b* and 24*b*, respectively. In the plane of first and second portions 22*a,b* and 24*a,b*, third portions 22*c* and 24*c* extend from the opposite ends of second portion 22*b* and 24*b* at an angle slightly less than 180° and in its most preferred form at an angle in the range of 160°. In its most preferred form, in a plane perpendicular to the first and second portions 24*a* and 24*b*, third portion 24*c* extends from the opposite end of second portion 24*b* at an angle less than 180° and in its most preferred form at an angle in the range of 140°.

Figure 3:
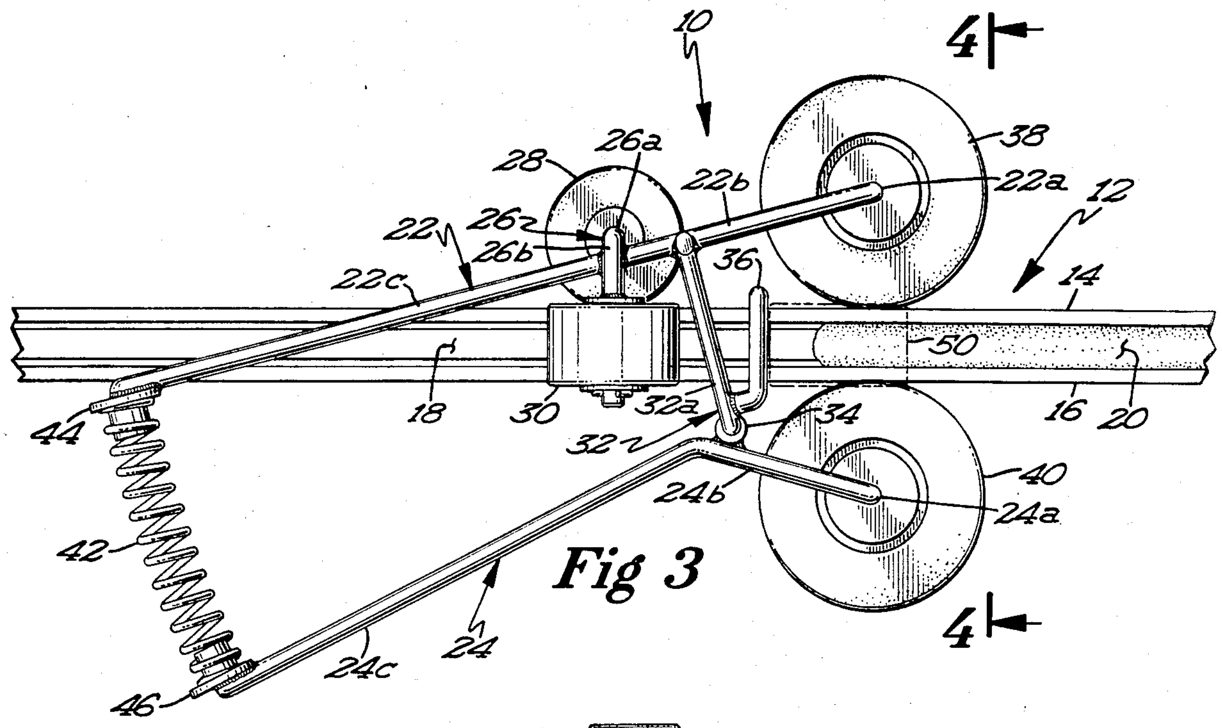
FIG. 3 shows a front view of the moveable, roller clamp of FIG. 1 in use in the formation of insulated glass.

Clamp 10 further includes a third arm 26 which in its most preferred form is L-shaped having a first portion 26*a* and a second portion 26*b*. Portions 26*a* and 26*b* are generally perpendicular to each other. Third arm 26 is secured to arm 22 generally at the interconnection of portions 22*b* and 22*c* and in its most preferred form, third arm 26 is secured to arm 22 at the intersection of portions 26*a* and 26*b*. Portion 26*a* is generally parallel to portion 22*a*, and portion 26*b* extends from portion 22*b* in a plane generally perpendicular to the plane of portions 22*a–c* (see particularly FIGS. 4 and 5) and at an angle from portion 22*b* slightly greater than 90° and in its most preferred form extends from portion 22*b* at an angle in the range of 105° (see particulary FIG. 3). In the most preferred form, guide wheels 28 and 30 are provided rotatably mounted to clamp 10 with portions 26*a* and 26*b* forming their respective rotational axes.

Clamp 10 further includes a fourth arm 32 which in its most preferred form is L-shaped having a first portion 32*a* and a second portion 32*b*. Portions 32*a* and 32*b* are generally perpendicular to each other. The first, free end of portion 32*a* is secured to portion 22*b* generally one quarter the length of portion 22*b* from the interconnection of portions 22*b* and 22*c*. Arm 32 extends in a plane generally perpendicular to the plane of portions 22*a–c* (see particularly FIGS. 4 and 5) and generally perpendicular to portion 22*b* in the same direction as portion 26*b* (see particularly FIG. 3). Second portion 32*b* is parallel to portions 22*a* and 26*a*. Arms 22 and 24 are pivotally connected together about the second end of portion 32*a* and along the pivot axis defined by portion 32*b*. In its most preferred form, arm 24 includes a cylindrical pivot 34 for rotational receipt of portion 32*b*. Pivot 34 extends generally parallel to portion 24*a* from portion 24*b* adjacent to the interconnection of portions 24*b* and 24*c*.

Clamp 10 further includes an applicator abutment 36 which extends from the second end of portion 32*a* generally parallel to portion 26*b* and thus is at angle from portion 32*a* generally equal to the number of degrees beyond 90 that portion 26*b* extends from portion 22*b* and in its most preferred form is at angle in the range of 15°. It can also be appreciated that abutment 36 is generally in the same plane as portions 22*b* and 32*a*.

Clamp 10 further includes clamping wheels 38 and 40 rotatably mounted to arms 22 and 24, respectively, with portions 22*a* and 24*a* forming their respective rotational axes.

Clamp 10 further includes member 42 shown in its most preferred form as a spring for biasing clamping wheels 38 and 40 together. In the most preferred form, spring 42 is held and extends between the free ends of portions 22*c* and 24*c* by spring mounts 44 and 46 which are secured generally perpendicular to portions 22*c* and 24*c*, respectively, and generally perpendicular to a plane passing through portions 22*a–c* and to a plane passing through portions 24*c* and 32*b*, respectively.

In the assembly of insulating glass 12, glass sheets 14 and 16 are laid flat on a table in a stacked condition separated by spacer 18. Sealing member 20 is gunned or pumped around the edges of sheets 14 and 16 in a liquid form and allowed to harden or cure. Particularly, as best seen in FIG. 1, a valving body or mechanism 48, such as the trigger operated, hand gun type valve as shown, controls the flow of sealing member 20 in liquid form to and through nozzle 50. Nozzle 50 is generally rectangular in shape having parallel notches in the outside corners for the slideable receipt of the edges of sheets 14 and 16. Due to the relatively thick nature of sealing member 20 in its liquid form and due to the gunned or pumped nature of its placement, a clamping operation is required to prevent movement of spacer 18 during the pumping of sealing member 20 in its liquid form.

Prior to the present invention, for large operations, a special table may be utilized having top and bottom air operated, straight clamp mechanisms. However, due to the relatively large expense for such specially equipped tables, this fabrication is generally uneconomical for most insulating glass fabricators.

Prior to the present invention, for most insulating glass fabricators, hand clamps 52 are utilized. Specifically, one clamp would be placed on each corner of the stacked sheets 14 and 16 and one or more clamps were placed in the middle of the side to the sealed. In particular, one clamp was placed in the middle of the side to be sealed for an average size window. Sealing member 20 could then be pumped along the clamped edge utilizing nozzle 50 and valving body 48, moving nozzle 50 from one corner to the other while activiating valving body 48 for the release of sealing member 20 in liquid form between stacked sheets 14 and 16. When nozzle 50 reached the clamps 52 in the middle of the side, pumping of sealing member 20 was stopped by valving body 48 and while holding nozzle 50 in place, the clamp 52 was removed and replaced on the opposite side of nozzle 50 where sealing member 20 was previously applied. Pumping of sealing member 20 could then be continued by activating valving body 48 and simultaneously moving nozzle 50 along the edge of the stacked sheets 14 and 16.

In operation of clamp 10 according to the preferred teachings of the present invention, hand clamps 52 are placed on each corner of stacked sheets 14 and 16 in a manner as seen in FIG. 1. Portions 22*c* and 24*c* of clamp 10 may then be grasped in the hand of the operator and squeezed together against the bias of spring 42. Due to the pivotal mounting of arms 22 and 24 by arm 32 and pivot 34, portions 22*a* and 24*a* and clamping wheels 38 and 40 separate when portions 22*c* and 24*c* are squeezed together. Clamp 10 may then be positioned on the stacked sheets 14 and 16 such that wheels 28 and 38 engage sheet 14, wheel 40 engages sheet 16, and wheel 30 engages with the edges of sheets 14 and 16. Clamp 10 should be positioned such that spring 42 is located in the same direction from abutment 36 as the intended movement of nozzle 50. Valving body 48 and nozzle 50 may then be positioned such that nozzle 50 is located between stacked sheets 14 and 16. During pumping of sealing member 20 in liquid form, nozzle 50 abuts with abutment 36 of clamp 10 and pushes clamp 10 along the edge of stacked sheets 14 and 16. Due to the rotatable nature of wheels 28, 30, 38 and 40, clamp 10 rolls along stacked sheets 14 and 16. Due to the pivotal mounting of arms 22 and 24 by arm 32 and pivot 34, spring 42 biases wheels 38 and 40, together placing a clamping force on stacked sheets 14 and 16.

Now that the construction and operation of roller clamp 10 according to the preferred form of the teachings of the present invention have been set forth, subtle features and advantages of the present invention can be set forth and appreciated. First, a clamping force may be applied to stacked glass sheets 14 and 16 by clamp 10 to prevent movement of spacer 18 between stacked glass sheets 14 and 16 during the application of liquid sealing member 20 between sheets 14 and 16. Furthermore, the utilization of hand clamps in the middle of the side of the stacked glass sheets to be sealed may be eliminated by the use of roller clamp 10 according to the teachings of the present invention. Due to movement of clamp 10 with nozzle 50, it is then not necessary to stop and move the hand clamps as was required prior to the present invention. Thus, time is saved in the fabrication of insulating glass 12 utilizing clamp 10 according to the teachings of the present invention. Furthermore, since it is not necessary to stop and start the pumping, sealing member 20 may be applied to stacked sheets 14 and 16 in a more uniform and consistent manner.

It can then be appreciated that wheel 28 keeps clamp 10 from tipping with respect to stacked sheets 14 and 16 if there is sufficient tension in spring 42. Furthermore, since the diameter of wheel 28 is less than the diameter of wheel 38, and in its most preferred form is two thirds of the diameter of wheel 38, arm 22 is not held in a plane parallel to sheet 14 but rather is at an angle thereto.

Figure 4:
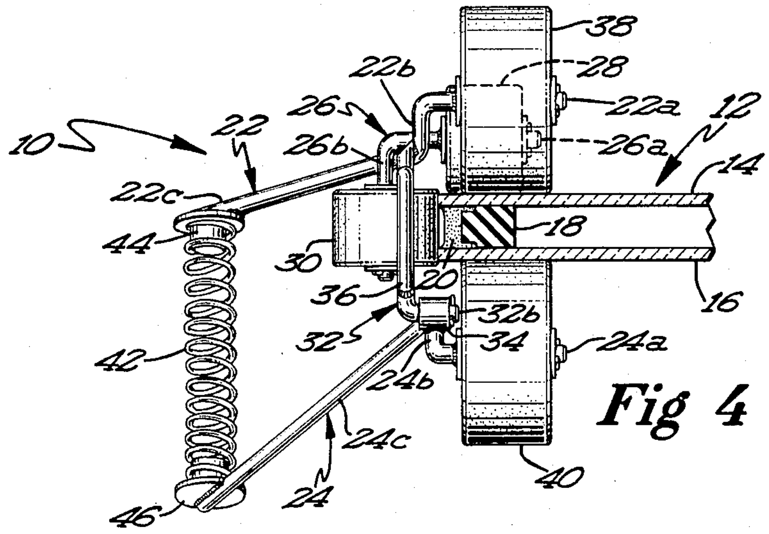
FIG. 4 shows a partial, cross sectional view of the moveable, roller clamp of FIG. 1 according to section line 4—4 of FIG. 3.
Figure 5:
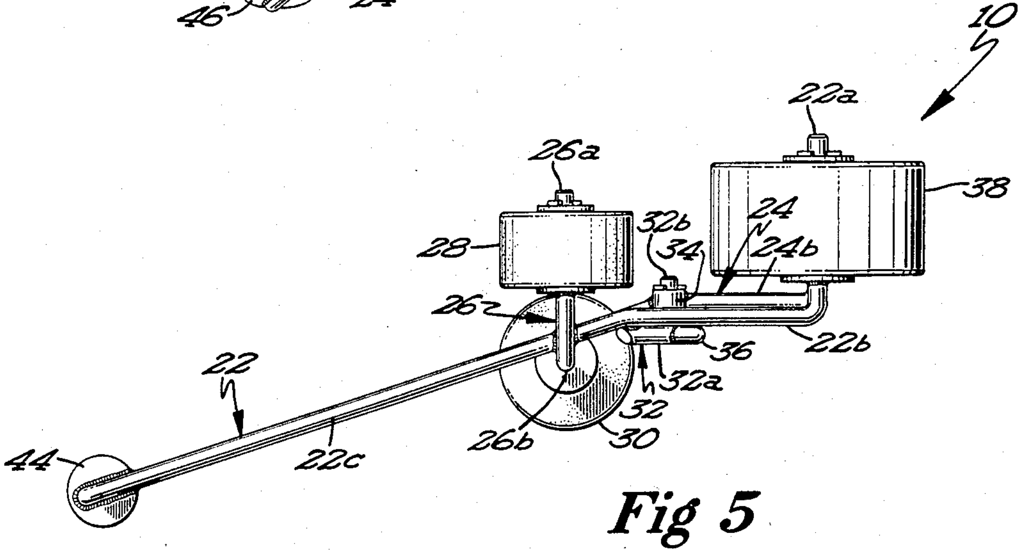
FIG. 5 shows a top view of the moveable, roller clamp of FIG. 1.

Furthermore, due to the angle of portions **22*c* and 24*c* from portions 22*b* and 24*b* in the plane of portions 22*a* and 22*b* and 24*a* and 24*b*, respectively (see particularly FIG. 5), spring 42 may be located at the free ends of portions 22*c* and 24*c* without abutting with the stacked sheets 14 and 16 (see particularly FIG. 4). Additionally, due to the angle of portion 24*c* from portion 24*b* from the plane of portions 24*a* and 24*b* (see particularly FIG. 5), sufficient spacing is provided between the free ends of portions 22*c* and 24*c* to allow for positioning of spring 42 even when portions 22*a* and 24*a* are separated for receipt of stacked sheets 14 and 16 between wheels 38 and 40**.

Due to the angular relation of abutment 36 with arm 32, nozzle 50 abuts with abutment 36 along an edge of nozzle 50 forming a square type abutment rather than a corner type abutment.

It should be appreciated that clamp 10 is not in any way physically secured to nozzle 50, valving body 48 or other apparatus for applying sealing member 20. Specifically, clamp 10 is simply pushed on stacked sheets 14 and 16 by the abutment of nozzle 50 of the apparatus for applying sealing member 20 with abutment 36 of clamp 10. Thus, roller clamp 10 according to the preferred form of the teachings of the present invention may be easily and rapidly utilized in the fabrication of insulating glass 12 and without interfering with the use of the apparatus for applying sealing member 20. In fact, as set forth hereinbefore, utilizing clamp 10 according to the teachings of the present invention enhances the ease of formation of glass 12 at least by eliminating the requirement to stop sealing application to remove and replace hand clamps in the middle of the side of stacked sheets 14 and 16 to be sealed.

In its most preferred form, abutment 36 is spaced from portions **22*a* and 24*a* in the direction of the intended movement of nozzle 50 such that nozzle 50 abutting with abutment 36 remains within the extremities of wheels 38 and 40 of clamp 10 away from abutment 36. Therefore, the clamping force is applied to stacked glass sheets 14 and 16 by clamping rollers 38 and 40 directly above and below nozzle 50 and where liquid sealing member 20 is being applied. Further, clamp 10 may be positioned on stacked sheets 14 and 16 with the wheels 38 and 40 located adjacent to the initial edge of the side to be sealed such that a clamping force can be placed on stacked sheets 14 and 16 at the very initial edge of the side to be sealed. Further, clamp 10 may be pushed by nozzle 50 until the nozzle 50 reaches the very end of the side to be sealed without having clamp 10 roll past the end of the side to be sealed and placing a clamping force on the stacked sheets 14 and 16 at the very end edge of the side to be sealed. Thus, the location of abutment 36 in relation to wheels 38 and 40** is particularly advantageous according to the preferred form of the teachings of the present invention.

It can then also be appreciated that the use of arm 32 to space the pivotal connection of arms 22 and 24 is advantageous according to the preferred form of the teachings of the present invention. Particularly, spacing the connection of arms 22 and 24 compensates for the diameter of wheels 38 and 40 and the thickness of insulating glass 12. Furthermore, spacing the connection of arms 22 and 24 allows spring 42 to act in compression to force portions **22*c* and 24*c*** apart, a more desirable and accurate condition than if the spring were acting in tension for example in a scissors type arrangement.

It can then be appreciated that roller clamp 10 according to the teachings of the present invention may be easily and economically manufactured and assembled. Furthermore, roller clamp 10 according to the teachings of the present invention may be easily and rapidly applied to the stacked glass sheets 14 and 16 in a manner similar to the placement of hand clamps as were utilized prior to the present invention. However, roller clamp 10 according to the teachings of the present invention allows the faster and easier application of sealing member 20 than prior to the present invention and allows the more consistent and accurate application of sealing member 20 between the edges of stacked sheets 14 and 16.

Now that the basic teachings of the present invention have been explained, many extensions and variations will be obvious to one having ordinary skill in the art. For example, although abutment 36 is shown as being separate from but attached to arm 32, it should be appreciated that abutment 36 can be formed integral with or as a part of arm 32, with the angular relation of arm 32 with arm 22 remaining the same, having the angular relation of abutment 36 with arm 22, or having an angular relation consistant with the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method of fabricating insulating glass comprising the steps of:

(a) providing a first sheet of glass having a first surface, an outside surface, and perimeter edges;
(b) providing a second sheet of glass having a first surface, an outside surface, and perimeter edges;
(c) providing a spacer;
(d) stacking the first and second sheets of glass with the spacer sandwiched between the first surfaces of the first and second sheets of glass;
(e) placing clamping forces on opposite perimeter edges of the stacked glass sheets and adjacent a perimeter edge of the stacked glass sheets to be sealed;
(f) providing a moveable clamp for placing a clamping force on the stacked glass sheets adjacent to the perimeter edge to be sealed;
(g) providing an applicator of a member for sealing the perimeter edges of the stacked glass sheets in a liquid form, with the liquid sealing member being delivered by a nozzle; and
(h) moving the nozzle along the perimeter edge of the stacked glass sheets to be sealed and simultaneously delivering liquid sealing member between the perimeter edges of the stacked glass sheets to be sealed and pushing the moveable clamp along the perimeter edge of the stacked glass sheets to be sealed for preventing movement of the spacer between the first and second glass sheets during the application of the liquid sealing member between the first and second glass sheets.

2. Moveable, roller clamp for use in the fabrication of insulating glass, with the insulating glass being formed by first and second, stacked glass sheets, with the glass sheets having a perimeter, outer surfaces, and edges, with the glass sheets being separated by a spacer located adjacent the perimeter of the glass sheets, and by a sealing member, with the sealing member being applied in a liquid form by a liquid sealing member applicator and allowed to harden between the first and second glass sheets, with the liquid sealing member being applied between the glass sheets by a nozzle, comprising, in combination: a first clamping roller having a rotatable axis for placing a force on the outer surface of the first glass sheet adjacent to the perimeter of the glass sheets; a second clamping roller having a rotatable axis for placing a force on the outer surface of the second glass sheet adjacent to the perimeter of the glass sheets; a first arm including a first portion interconnected to a second portion interconnected to a third portion, with the first portion forming the rotatable axis of the first clamping roller, with the first portion of the first arm being perpendicular to the second portion of the first arm, and with the third portion of the first arm being interconnected to the second portion of the first arm at an angle of slightly less than 180° in the plane of the first and second portions of the first arm; a second arm including a first portion interconnected to the second portion interconnected to a third portion, with the first portion forming the rotatable axis of the second clamping roller, with the first portion of the second arm being perpendicular to the second portion of the second arm, and with the third portion of the second arm being interconnected to the second portion of the second arm in the plane of the first and second portions of the second arm at an angle equal to the angle between the second and third portions of the first arm in the plane of the first and second portions of the first arm; a third arm having a first end and a second end, with the first end of the third arm being connected to the second portion of the first arm, with the second end of the third arm being pivotally connected to the second portion of the second arm; a spring located between and in compression between the third portions of the first and second arms for biasing the second ends of the first and second arms apart for biasing the first and second clamping rollers together to place a clamping force on the first and second, stacked glass sheets; wherein the angle between the second and third portions of the first and second arms allow the spring to be outside of the perimeter of the stacked glass sheets and without abutting the perimeter of the stacked glass sheets; a first guide roller rotatably mounted to the first arm about an axis generally perpendicular to the axes of the first and second clamping rollers for rolling along the edges of the first and second, stacked glass sheets for preventing the first and second clamping rollers from moving on the outer surface of the stacked glass sheets away from the perimeter of the stacked glass sheets; and means located on the third arm for abutting with the nozzle of the liquid sealing member applicator allowing the first and second clamping rollers to be pushed by the nozzle applying the liquid sealing member along an edge of the stacked glass sheets as the liquid sealing member is being applied between the stacked glass sheets by the nozzle and allowing the first and second clamping rollers to place a continuous clamping force to the first and second, stacked glass sheets which is moveable with the movement of the nozzle applying the liquid sealing member along the edge of the stacked glass sheets to prevent movement of the spacer between the first and second glass sheets during the application of the liquid sealing member between the first and second glass sheets.

3. The moveable, roller clamp of claim 2 wherein the third portion of the second arm is interconnected to the second portion of the second arm at an angle of less than 180° in a plane perpendicular to the plane of the first and second portions of the second arm for providing sufficient spacing between the third portions of the first and second arms for receipt of the spring.

4. The moveable, roller clamp of claim 2 further comprising, in combination: a second guide roller secured to the first arm for rolling on the outside surface of the first glass sheet for preventing the first and second arms from tipping with respect to the stacked glass sheets with the second guide roller being rotatable about an axis which is parallel to but spaced from the axes of the first and second clamping rollers.

5. The moveable clamp of claim 4 wherein the diameter of the second guide roller is less than the diameter of the clamping rollers, with the abutting means being at an angle to the first arm in the plane of the second portions of the first and second arms allowing the nozzle to abut squarely along the abutment.

6. Moveable clamp for use in the fabrication of insulating glass, with the insulating glass being formed by first and second, stacked glass sheets, with the glass sheets having a perimeter, outer surfaces, and edges, with the glass sheets being separated by a spacer located adjacent the perimeter of the glass sheets, and by a sealing member, with the sealing member being applied in a liquid form by a liquid sealing member applicator and allowed to harden between the first and second glass sheets, with the liquid sealing member being applied between the glass sheets by a nozzle, comprising, in combination: first means for placing a force on the outer surface of the first glass sheet adjacent to the perimeter of the glass sheets; second means for placing a force on the outer surface of the second glass sheet adjacent to the perimeter of the glass sheets; third means for biasing the first and second force placing means together to place a clamping force on the first and second, stacked glass sheets; and means located on the third means for abutting with the nozzle of the liquid sealing member applicator allowing the first and second force placing means to be pushed by the nozzle applying the liquid sealing member along an edge of the stacked glass sheets as the liquid sealing member is being applied between the stacked glass sheets by the nozzle and allowing the first and second force placing means to place a continuous clamping force to the first and second, stacked glass sheets which is moveable with the movement of the nozzle applying the liquid sealing member along the edge of the stacked glass sheets to prevent movement of the spacer between the first and second glass sheets during the application of the liquid sealing member between the first and second glass sheets.

7. The moveable clamp of claim 6 further comprising, in combination: means located on the third means for preventing the first and second force placing means from moving on the outer surface of the stacked glass sheets away from the perimeter of the stacked glass sheets.

8. The moveable clamp of claim 6 wherein the means for preventing the force placing means from moving away from the perimeter of the stacked glass sheets comprises, in combination; a first guide roller rotatably mounted to the third means about an axis for rolling along the edges of the first and second, stacked glass sheets.

9. The moveable clamp of claim 8 wherein the third means comprises, in combination: a first arm, with the first force placing means being mounted to the first arm; a second arm, with the second force placing means being mounted to the second arm; means for pivotally connecting the first arm to the second arm; and means for biasing the first and second arms to cause the first and second force placing means to be urged together.

10. The moveable clamp of claim 9 wherein the first arm has a first end and a second end and wherein the second arm has a first end and a second end; wherein the pivotally connecting means comprises, in combination: a third arm having a first end and a second end, with the first end of the third arm being connected to the first arm intermediate the first and second ends of the first arm, with the second end of the third arm being pivotally connected to the second arm intermediate the first and second ends of the second arm, with the first force placing means located adjacent the first end of the first arm and the second force placing means located adjacent the first end of the second arm; and wherein the first and second arm biasing means comprises, in combination: means for biasing the second ends of the first and second arms apart.

11. The moveable clamp of claim 10 wherein the first and second force placing means comprise, in combination: clamping rollers.

12. The moveable clamp of claim 11 wherein the first arm includes a first portion interconnected to a second portion interconnected to a third portion, with the first portion forming the rotatable axis of the first clamping roller, with the first portion of the first arm being perpendicular to the second portion of the first arm, and with the third portion of the first arm being interconnected to the second portion of the first arm at an angle of slightly less than 180° in the plane of the first and second portions of the first arm; wherein the second arm includes a first portion interconnected to the second portion interconnected to a third portion, with the first portion forming the rotatable axis of the second clamping roller, with the first portion of the second arm being perpendicular to the second portion of the second arm, and with the third portion of the second arm being interconnected to the second portion of the second arm in the plane of the first and second portions of the second arm at an angle equal to the angle between the second and third portions of the first arm in the plane of the first and second portions of the first arm; wherein the means for biasing the second ends of the first and second arms apart comprises, in combination: a spring located between and in compression between the third portions of the first and second arms; and wherein the angle between the second and third portions of the first and second arms allow the spring to be outside of the perimeter of the stacked glass sheets and without abutting the perimeter of the stacked glass sheets.

13. The moveable clamp of claim 12 wherein the third portion of the second arm is interconnected to the second portion of the second arm at an angle of less than 180° in a plane perpendicular to the plane of the first and second portions of the second arm for providing sufficient spacing between the third portions of the first and second arms for receipt of the spring.

14. The moveable clamp of claim 13 further comprising, in combination: means secured to the third means for preventing the first and second arms from tipping with respect to the stacked glass sheets.

15. The moveable clamp of claim 14 wherein the tipping preventing means comprises, in combination: a second guide roller for rolling on the outside surface of the first glass sheet, with the guide roller being rotatable about an axis which is parallel to but spaced from the axes of the first and second clamping rollers.

16. The moveable clamp of claim 15 wherein the diameter of the second guide roller is less than the diameter of the clamping rollers; wherein the abutting means comprises, in combination: an abutment secured to the third arm, with the abutment being at an angle to the first arm in the plane of the second portions of the first and second arms allowing the nozzle to abut squarely along the abutment.

17. The moveable clamp of claim 16 wherein the axis of the first guide roller is parallel to the abutment.

18. The moveable clamp of claim 17 wherein the third arm is located generally one quarter the length of the second portion of the first arm from the interconnection of the second and third portions of the first arm; wherein the third arm is generally perpendicular to the plane of the first and second portions of the first arm; and wherein the third arm is pivotally connected to the second arm generally at the interconnection of the second and third portions of the second arm.

19. The moveable clamp of claim 6 further comprising, in combination: means secured to the third means for preventing the first and second arms from tipping with respect to the stacked glass sheets.

20. The moveable clamp of claim 6 wherein the third means comprises, in combination: a first arm having a first end and a second end; a second arm having a first end and a second end; a third arm having a first end and a second end, with the first end of the third arm being connected to the first arm intermediate the first and second ends of the first arm, with the second end of the third arm being pivotally connected to the second arm intermediate the first and second ends of the second arm, with the first force placing means located adjacent the first end of the first arm and the second force placing means located adjacent the first end of the second arm; and means for biasing the second ends of the first and second arms apart.

21. The moveable clamp of claim 20 wherein the first and second force placing means comprise, in combination: clamping rollers; and wherein the first arm includes a first portion interconnected to a second portion interconnected to a third portion, with the first portion forming the rotatable axis of the first clamping roller, with the first portion of the first arm being perpendicular to the second portion of the first arm, and with the third portion of the first arm being interconnected to the second portion of the first arm at an angle of slightly less than 180° in the plane of the first and second portions of the first arm; wherein the second arm includes a first portion interconnected to the second portion interconnected to a third portion, with the first portion forming the rotatable axis of the second clamping roller, with the first portion of the second arm being perpendicular to the second portion of the second arm, and with the third portion of the second arm being interconnected to the second portion of the second arm in the plane of the first and second portions of the second arm at an angle equal to the angle between the second and third portions of the first arm in the plane of the first and second portions of the first arm; wherein the means for biasing the second ends of the first and second arms apart comprises, in combination: a spring located between and in compression between the third portions of the first and second arms; and wherein the angle between the second and third portions of the first and second arms allow the spring to be outside of the perimeter of the stacked glass sheets and without abutting the perimeter of the stacked glass sheets.

22. The moveable clamp of claim 21 wherein the third portion of the second arm is interconnected to the second portion of the second arm at an angle of less than 180° in a plane perpendicular to the plane of the first and second portions of the second arm for providing sufficient spacing between the third portions of the first and second arms for receipt of the spring.

* * * * *